(12) United States Patent
Kim et al.

(10) Patent No.: US 11,283,093 B2
(45) Date of Patent: Mar. 22, 2022

(54) METHOD FOR MANUFACTURING ELECTRODE, ELECTRODE MANUFACTURED THEREBY, MEMBRANE-ELECTRODE ASSEMBLY COMPRISING SAME ELECTRODE, AND FUEL CELL INCLUDING SAME MEMBRANE-ELECTRODE ASSEMBLY

(71) Applicant: KOLON INDUSTRIES, INC., Seoul (KR)

(72) Inventors: Jung Ho Kim, Yongin-si (KR); Hyeong Su Kim, Yongin-si (KR)

( * ) Notice: Subject to any disclaimer, the term of this patent is extended or adjusted under 35 U.S.C. 154(b) by 188 days.

(21) Appl. No.: 16/343,522

(22) PCT Filed: Dec. 22, 2017

(86) PCT No.: PCT/KR2017/015301
§ 371 (c)(1),
(2) Date: Apr. 19, 2019

(87) PCT Pub. No.: WO2018/124645
PCT Pub. Date: Jul. 5, 2018

(65) Prior Publication Data
US 2019/0245232 A1    Aug. 8, 2019

(30) Foreign Application Priority Data

Dec. 28, 2016  (KR) .................. 10-2016-0181590
Jan. 2, 2017   (KR) .................. 10-2017-0000025

(51) Int. Cl.
| | |
|---|---|
| *H01M 8/1004* | (2016.01) |
| *H01M 4/88* | (2006.01) |
| *C04B 41/48* | (2006.01) |
| *C01B 32/18* | (2017.01) |
| *C01B 32/194* | (2017.01) |
| *C01B 32/168* | (2017.01) |
| *C09C 1/56* | (2006.01) |
| *C09C 3/10* | (2006.01) |
| *H01M 4/86* | (2006.01) |

(52) U.S. Cl.
CPC ......... *H01M 8/1004* (2013.01); *C01B 32/168* (2017.08); *C01B 32/18* (2017.08); *C01B 32/194* (2017.08); *C04B 41/48* (2013.01); *C04B 41/4892* (2013.01); *C09C 1/56* (2013.01); *C09C 3/10* (2013.01); *H01M 4/86* (2013.01); *H01M 4/88* (2013.01); *H01M 4/8803* (2013.01); *C01P 2002/01* (2013.01); *C01P 2004/04* (2013.01); *C01P 2006/40* (2013.01); *Y02E 60/50* (2013.01); *Y02P 70/50* (2015.11)

(58) Field of Classification Search
CPC ........ H01M 8/1004; H01M 4/88; H01M 4/86; H01M 4/8803; H01M 2008/1095; H01M 4/8828; H01M 4/926; C04B 41/48; C04B 41/4892; C01B 32/18; C01B 32/194; C01B 32/168; C09C 1/56; C09C 3/10; Y02E 60/50; Y02P 70/50; C01P 2004/04; C01P 2002/01; C01P 2006/40
See application file for complete search history.

(56) References Cited

U.S. PATENT DOCUMENTS

| | | | |
|---|---|---|---|
| 7,188,993 B1 | 3/2007 | Howe et al. | |
| 2006/0275648 A1 | 12/2006 | Kim | |
| 2011/0200916 A1 | 8/2011 | Morinaga | |
| 2011/0294658 A1 | 12/2011 | Lefevre et al. | |
| 2014/0099571 A1* | 4/2014 | Proietti | ............... H01M 4/8828 429/527 |
| 2014/0121298 A1* | 5/2014 | Yang | .................. G03G 15/2057 523/218 |
| 2014/0205929 A1 | 7/2014 | Mashio et al. | |
| 2015/0180047 A1 | 6/2015 | Hasegawa et al. | |
| 2015/0266028 A1 | 9/2015 | Marzullo et al. | |

FOREIGN PATENT DOCUMENTS

| | | |
|---|---|---|
| JP | 2003-282067 A | 10/2003 |
| JP | 2006-286329 A | 10/2006 |
| JP | 2007-265734 A | 10/2007 |
| JP | 2011-159586 A | 8/2011 |
| JP | 2013045694 A | 3/2013 |
| JP | 2013251278 A | 12/2013 |
| JP | 2014524110 A | 9/2014 |
| JP | 2014229528 A | 12/2014 |
| JP | 10-2015-0075106 A | 7/2015 |
| KR | 10-1080783 B1 | 11/2011 |
| KR | 10-2015-0037922 A | 4/2015 |
| KR | 10-2017-0079621 A | 7/2017 |
| WO | 2009091430 A1 | 7/2009 |
| WO | 2012/107838 A1 | 8/2012 |

(Continued)

OTHER PUBLICATIONS

Supplementary European Search Report issued by the European Patent Office (EPO) dated Sep. 1, 2020.

(Continued)

*Primary Examiner* — Muhammad S Siddiquee
(74) *Attorney, Agent, or Firm* — Harvest IP Law, LLP

(57) ABSTRACT

Disclosed are a method for manufacturing an electrode, an electrode manufactured thereby, a membrane-electrode assembly including the electrode, and a fuel cell containing the membrane-electrode assembly. The method includes the steps of: preparing an electrode forming composition by mixing a catalyst with an ionomer; applying a low-frequency acoustic energy to the electrode forming composition to perform resonant vibratory mixing so as to coat the ionomer on the surface of the catalyst; and coating the electrode forming composition to manufacture an electrode.

5 Claims, 9 Drawing Sheets

(56) References Cited

FOREIGN PATENT DOCUMENTS

| WO | 2013133724 A2 | 9/2013 |
| WO | 2014020650 A1 | 2/2014 |
| WO | 2014/185498 A1 | 11/2014 |

OTHER PUBLICATIONS

Bruno G. Pollet, "Let's Not Ignore the Ultrasonic Effects on the Preparation of Fuel Cell Materials", Electrocatalysis, 2014, pp. 330-343.
International Searching Authority, International Search Report for PCT/KR2017/015301 dated Mar. 30, 2018 (PCT/ISA/210).
JP office action dated Jun. 23, 2021.

* cited by examiner

[FIG. 1]
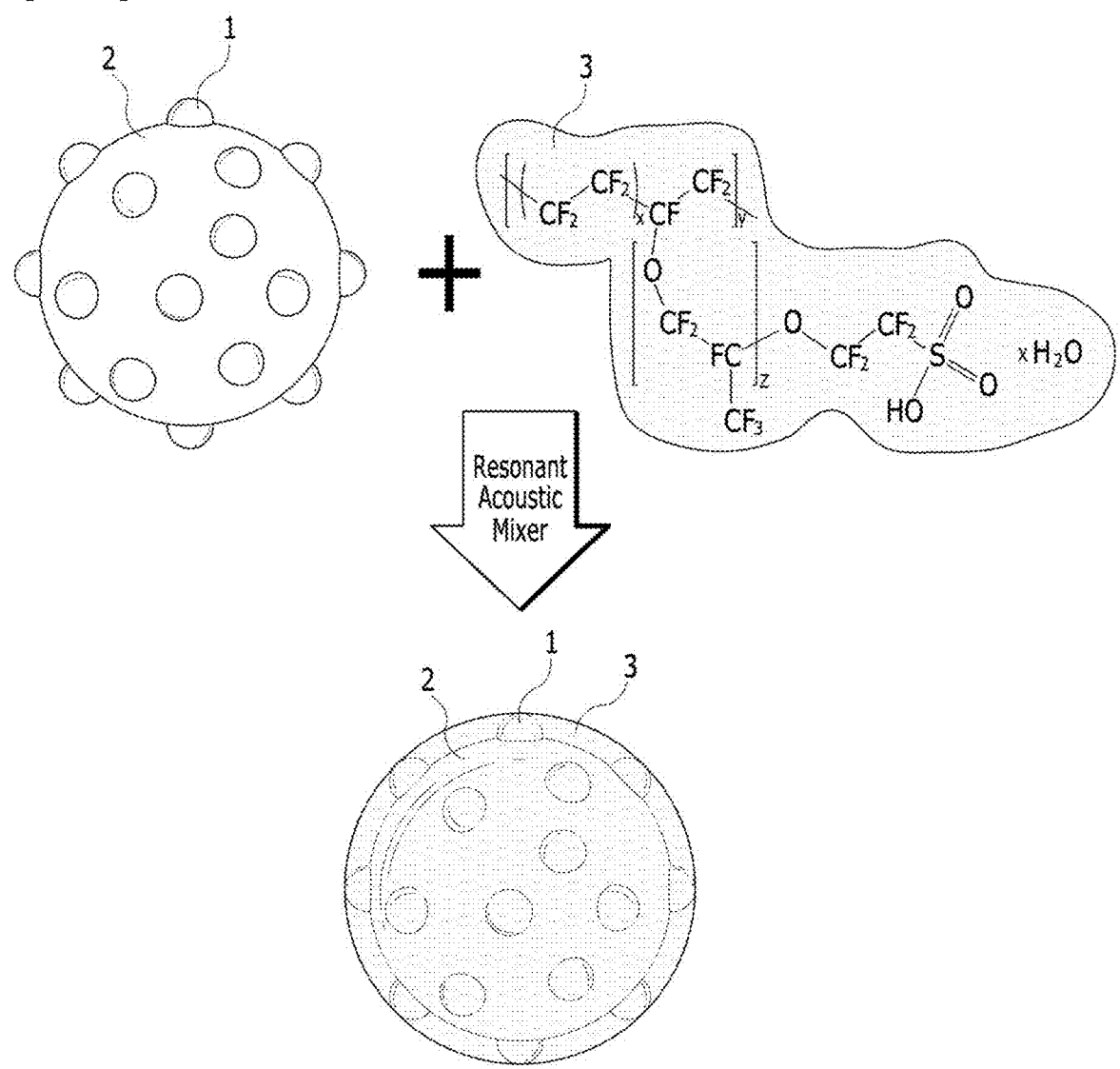

[FIG. 2]
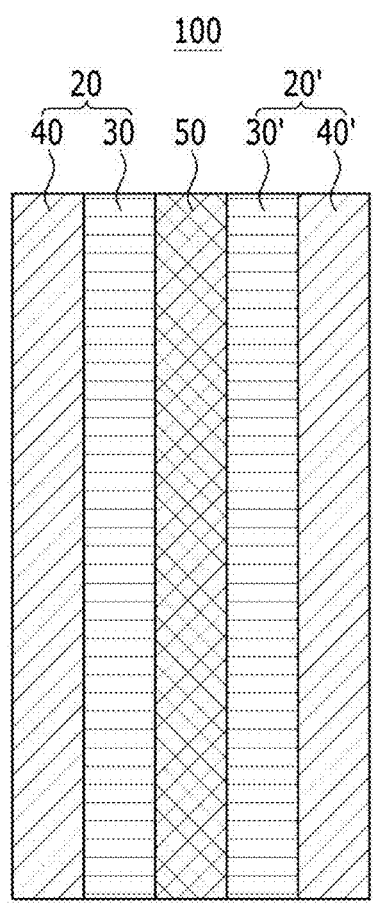

[FIG. 3]
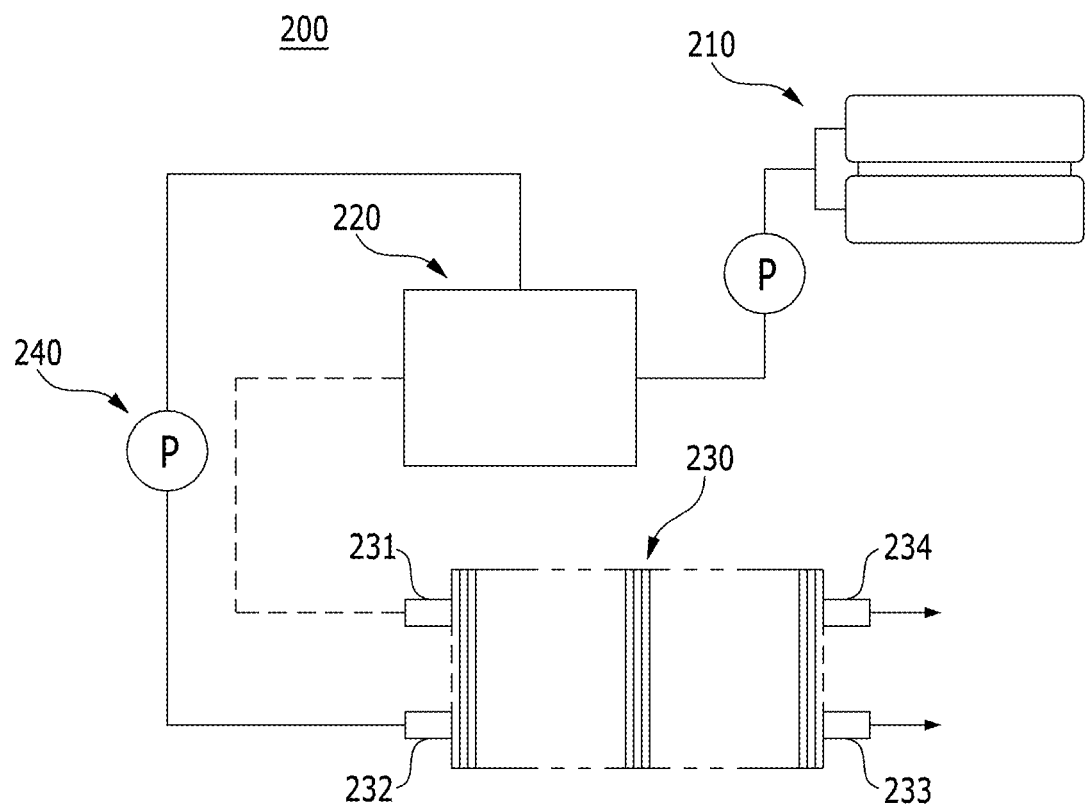

[FIG. 4]
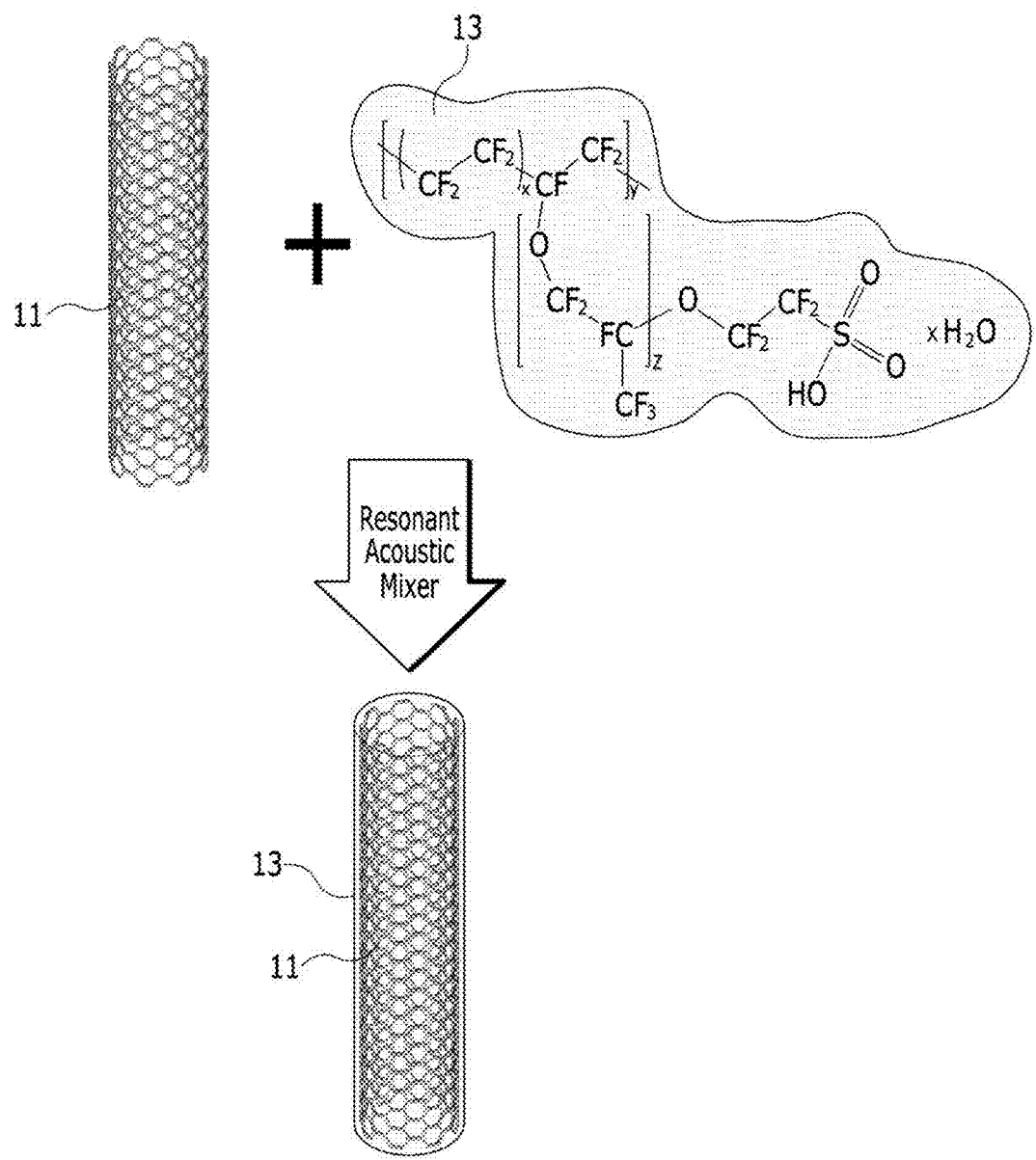

[FIG. 5]
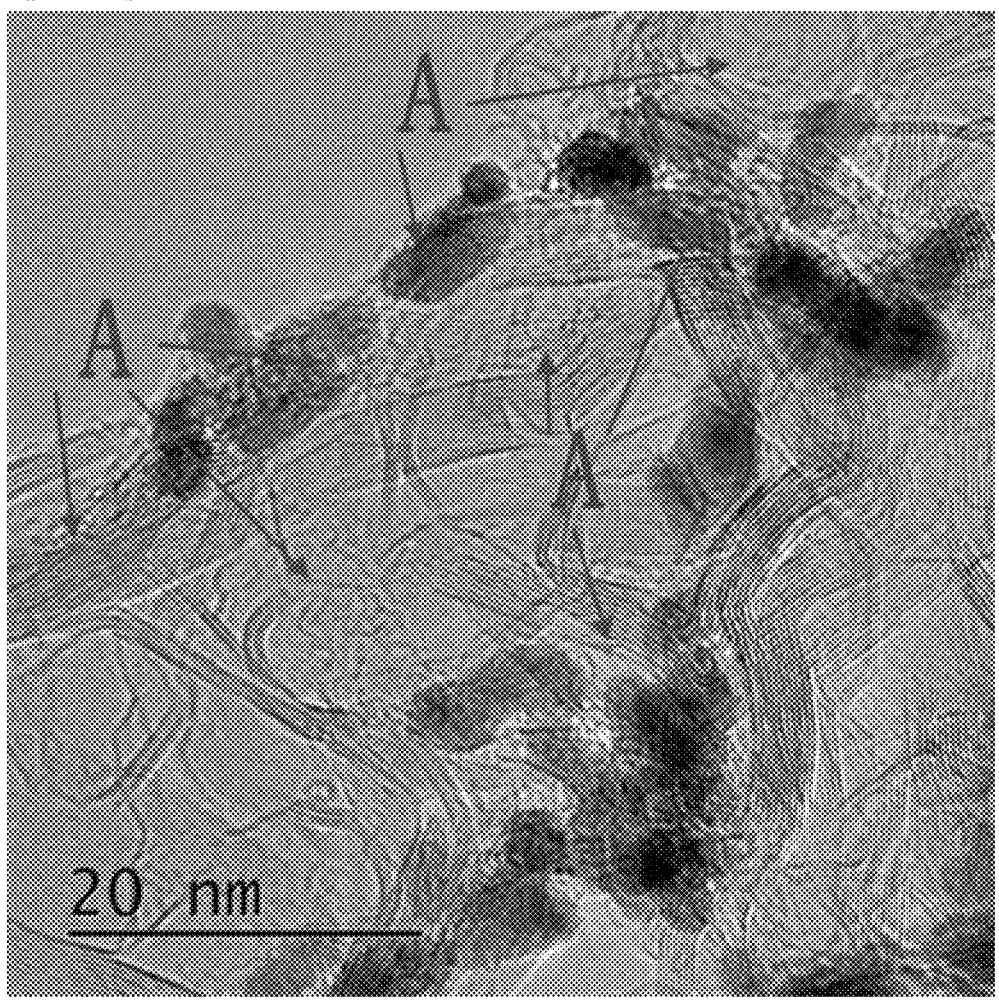

[FIG. 6]
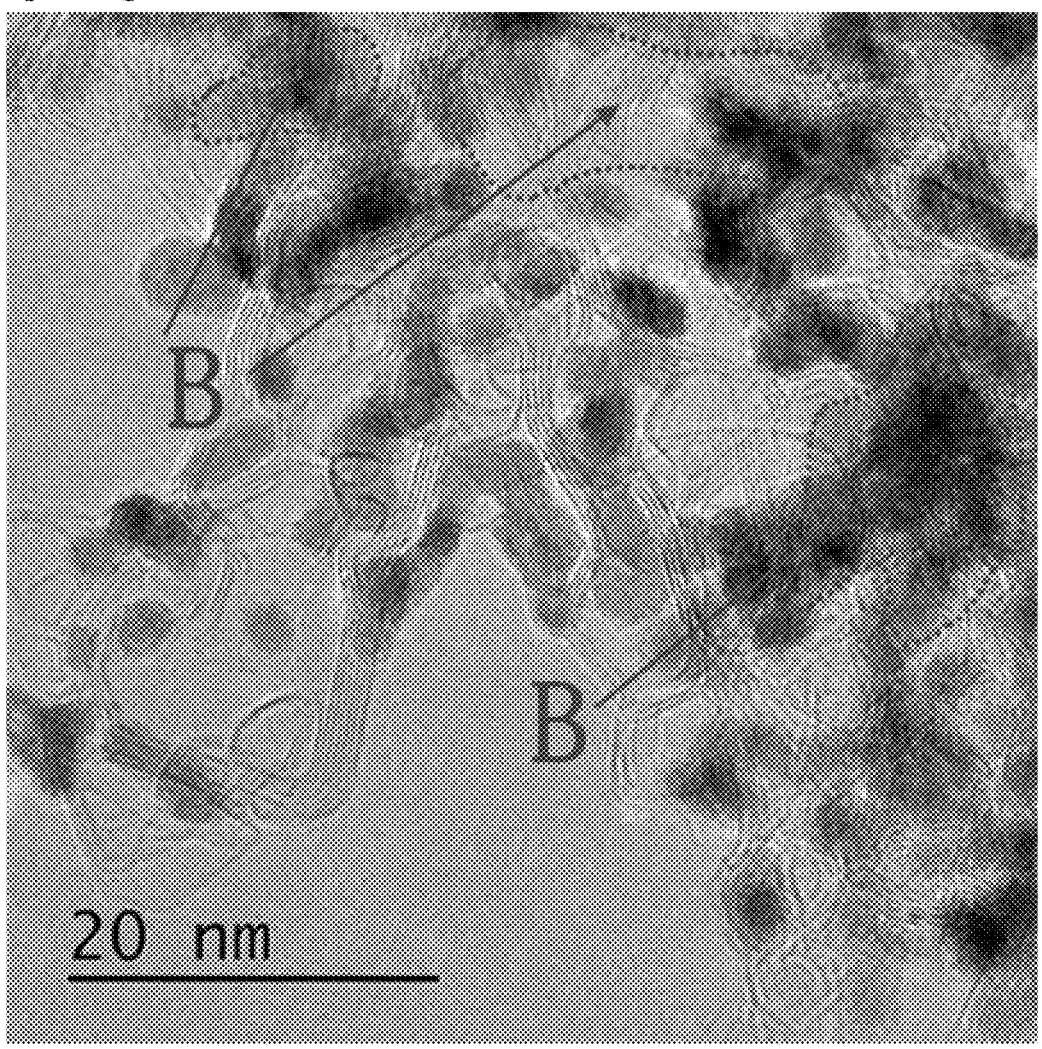

[FIG. 7]
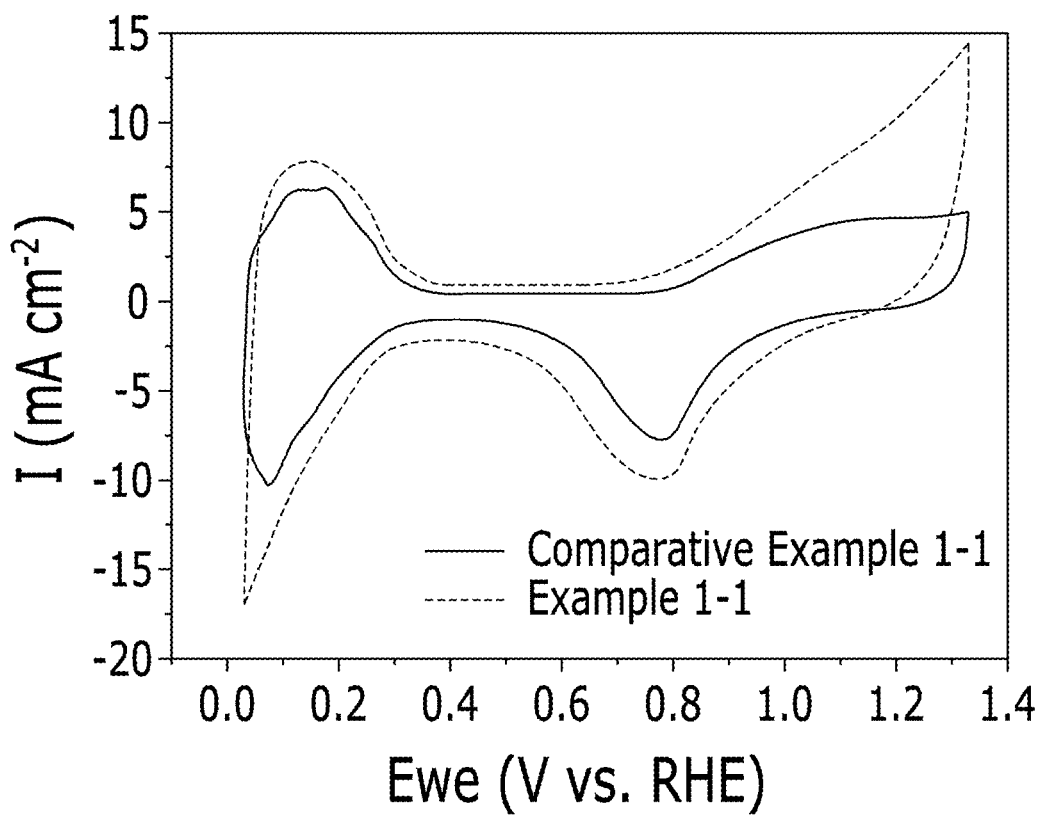

[FIG. 8]
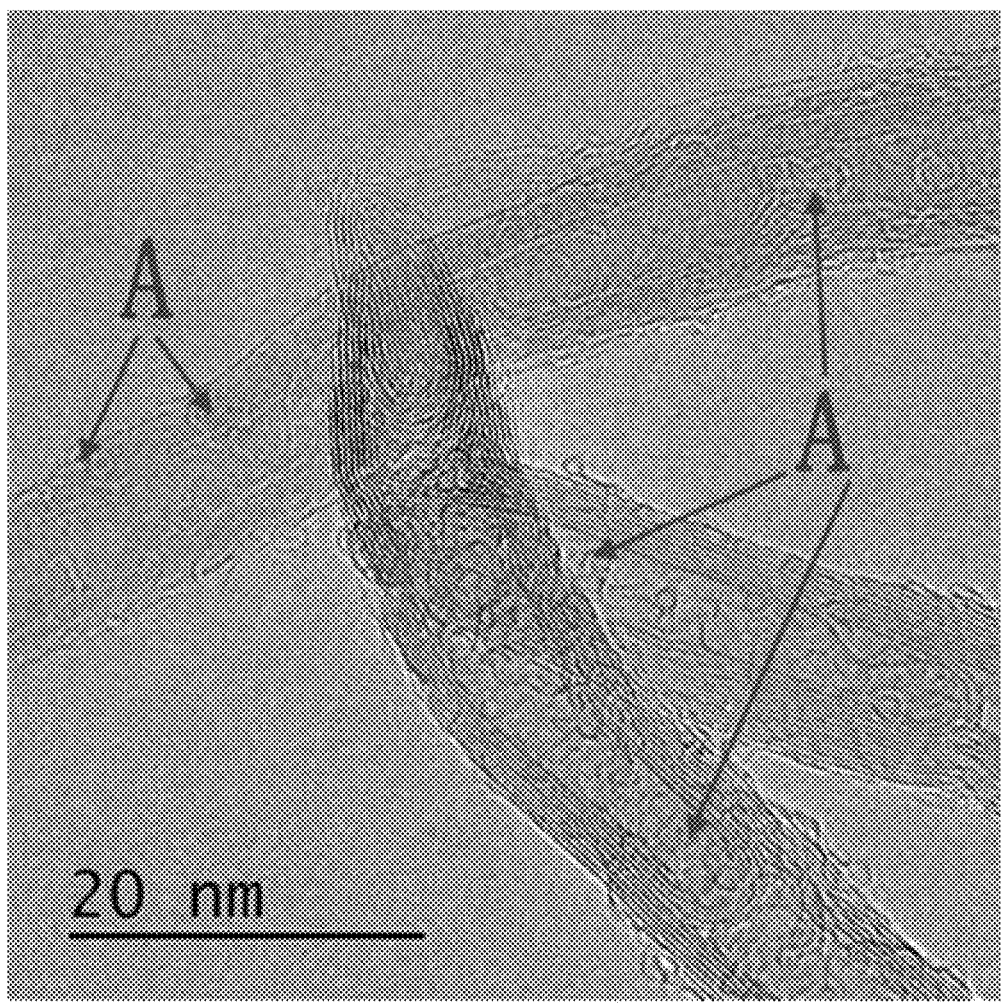

[FIG. 9]
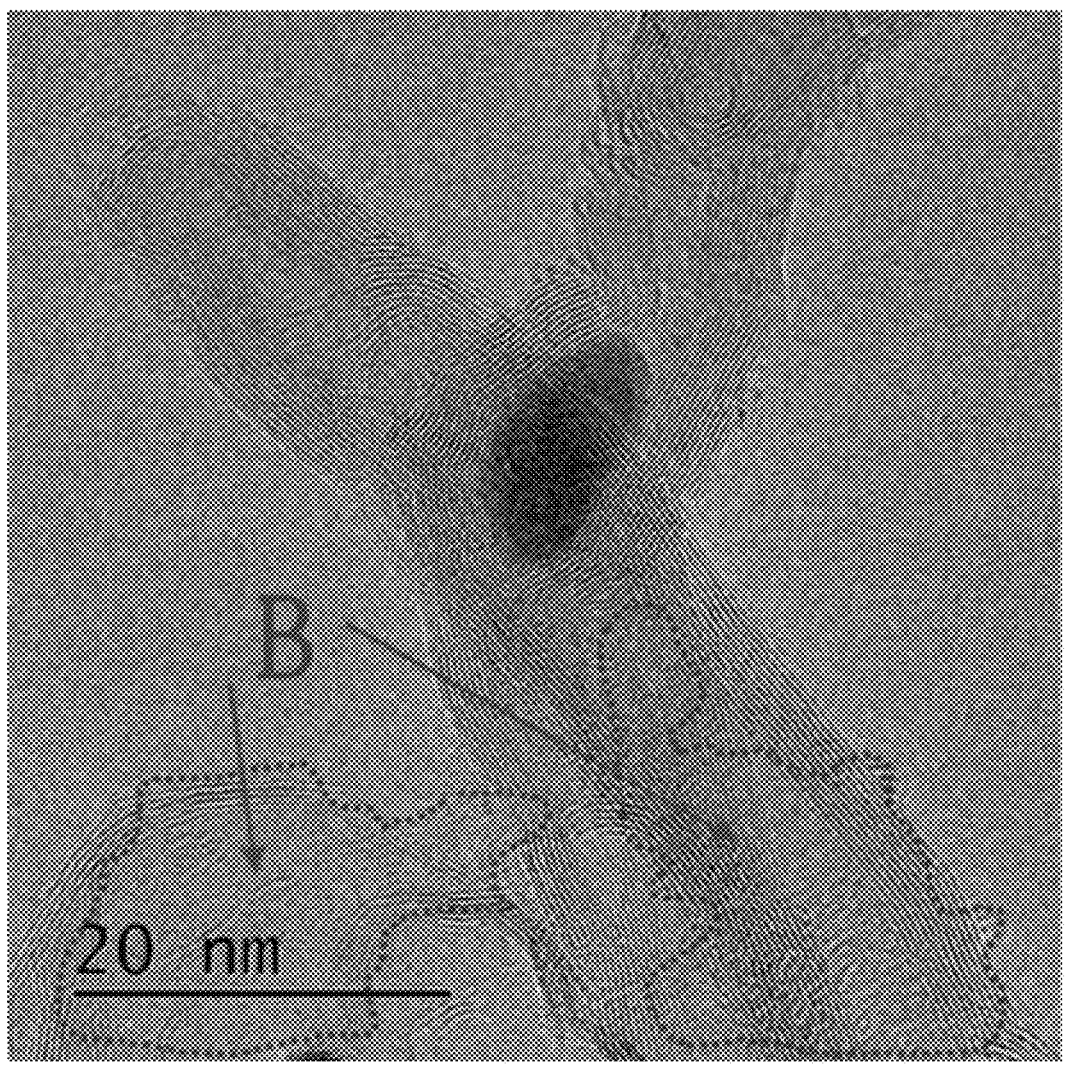

METHOD FOR MANUFACTURING ELECTRODE, ELECTRODE MANUFACTURED THEREBY, MEMBRANE-ELECTRODE ASSEMBLY COMPRISING SAME ELECTRODE, AND FUEL CELL INCLUDING SAME MEMBRANE-ELECTRODE ASSEMBLY

CROSS REFERENCE TO RELATED APPLICATIONS

This application is a National Stage of International Application No. PCT/KR2017/015301 filed on Dec. 22, 2017, claiming priorities based on Korean Patent Application Nos. 10-2016-0181590 filed on Dec. 28, 2016 and 10-2017-0000025 filed on Jan. 2, 2017.

TECHNICAL FIELD

The present invention relates to a method of manufacturing an electrode, an electrode manufactured thereby, a membrane-electrode assembly comprising the electrode and a fuel cell including the membrane-electrode assembly, and more particularly, to a method of manufacturing an electrode, the method which increases utilization ratio of the catalyst and the ionomer to improve various performances and increases coupling efficiency between the catalyst and the ionomer such that durability can be enhanced by coating an ionomer to a nanometer thickness on the surface of a catalyst to increase dispersibility of the catalyst or the like, thereby facilitating a mixing process and enabling the ionomer to be uniformly distributed on the surface of the catalyst, an electrode manufactured thereby, a membrane-electrode assembly comprising the electrode, and a fuel cell including the membrane-electrode assembly.

Further, the present invention relates to a method of manufacturing an ionomer-coated carbon structure and an ionomer-coated carbon structure manufactured thereby, and more particularly, to a method of manufacturing an ionomer-coated carbon structure, the method which increases utilization ratio of the carbon structure and the ionomer to improve various performances and increases coupling efficiency between the carbon structure and the ionomer such that durability can be enhanced by coating an ionomer to a nanometer thickness on the surface of a carbon structure to increase dispersibility of the carbon structure or the like, thereby facilitating a mixing process, increasing dispersion stability and enabling the ionomer to be uniformly distributed on the surface of the carbon structure, and an ionomer-coated carbon structure manufactured thereby.

BACKGROUND ART

A fuel cell, as a battery including a power generation system which directly converts chemical reaction energy such as oxidation/reduction reaction of hydrogen and oxygen contained in a hydrocarbon-based fuel material such as methanol, ethanol or a natural gas into electric energy, has been spotlighted as a next generation clean energy source capable of replacing fossil energy due to its high energy efficiency and environmentally friendly properties such as less contaminant discharging properties.

Such a fuel cell has an advantage that it can exhibit various ranges of outputs through a stack configuration by stacking of unit cells, and the fuel cell can exhibit an energy density 4 to 10 times higher than a small lithium battery. Therefore, the fuel cell has been receiving attention as a small and mobile portable power supply.

A stack which substantially generates electricity in the fuel cell has a structure in which several to tens of unit cells comprised of a membrane-electrode assembly (MEA) and separators (or referred to as "bipolar plates") are stacked, and the membrane-electrode assembly generally has a structure in which an oxidation electrode (an anode or a fuel electrode) and a reduction electrode (a cathode or an air electrode) are each formed at both sides of an electrolyte membrane.

The fuel cell may be divided into an alkaline electrolyte fuel cell, a polymer electrolyte membrane fuel cell (PEMFC), and the like according to states and types of an electrolyte. The polymer electrolyte membrane fuel cell among the alkaline electrolyte fuel cell, the polymer electrolyte membrane fuel cell and the like has been spotlighted as a portable, automobile or household power supply device due to advantages including a low operating temperature of less than 100° C., fast starting and response characteristics, excellent durability and the like.

Typical examples of the polymer electrolyte membrane fuel cell may include a proton exchange membrane fuel cell (PEMFC) using hydrogen gas as fuel, a direct methanol fuel cell (DMFC) using a liquid methanol as fuel, and the like.

Reaction which occurs in the polymer electrolyte membrane fuel cell may be summarized as follows. First of all, when fuel such as hydrogen gas is supplied to the oxidation electrode, the oxidation electrode generates hydrogen ions ($H^+$) and electrons ($e^-$) by oxidation reaction of hydrogen. The generated hydrogen ions are transferred to the reduction electrode through a polymer electrolyte membrane, and the generated electrons are transferred to the reduction electrode through an external circuit. The reduction electrode supplies oxygen, and oxygen is bonded to the hydrogen ions and electrons to produce water by a reduction reaction of oxygen.

On the other hand, the electrode of the fuel cell is comprised of a catalyst and an ionomer, and coupling and dispersibility between the catalyst and the ionomer have a great effect on performance and durability of the fuel cell.

DISCLOSURE

Technical Problem

An objective of the present invention is to provide a method of manufacturing an electrode, the method which increases utilization ratio of the catalyst and the ionomer to improve various performances and increases coupling efficiency between the catalyst and the ionomer such that durability can be enhanced by coating an ionomer to a nanometer thickness on the surface of a catalyst to increase dispersibility of the catalyst or the like, thereby facilitating a mixing process and enabling the ionomer to be uniformly distributed on the surface of the catalyst.

Other objective of the present invention is to provide an electrode manufactured by the method of manufacturing the electrode.

Another objective of the present invention is to provide a membrane-electrode assembly comprising the electrode.

Another objective of the present invention is to provide a fuel cell including the membrane-electrode assembly.

Another objective of the present invention is to provide a method of manufacturing an ionomer-coated carbon structure, the method which increases utilization ratio of the carbon structure and the ionomer to improve various performances and increases coupling efficiency between the carbon structure and the ionomer such that durability can be enhanced by coating an ionomer to a nanometer thickness on the surface of a carbon structure to increase dispersibility of the carbon structure or the like, thereby facilitating a mixing process, increasing dispersion stability and enabling the ionomer to be uniformly distributed on the surface of the carbon structure.

Another objective of the present invention is to provide an ionomer-coated carbon structure manufactured by the method of manufacturing the ionomer-coated carbon structure.

Technical Solution

A method of manufacturing an electrode according to an embodiment of the present invention is provided, the method comprising a step of preparing an electrode forming composition comprising a catalyst and an ionomer, a step of applying a low-frequency acoustic energy to the electrode forming composition, thereby performing resonant vibratory mixing of the electrode forming composition to coat the ionomer on the surface of the catalyst, and a step of coating the electrode forming composition to manufacture an electrode.

The low-frequency acoustic energy may have a frequency of 10 to 100 Hz.

The resonant vibratory mixing may be performed by applying an accelerated velocity of 10 to 100 G to the electrode forming composition comprising the catalyst and the ionomer.

The resonant vibratory mixing may be performed for 30 seconds to 30 minutes.

The electrode forming composition may further comprise a solvent.

An electrode according to other embodiment of the present invention is provided, the electrode comprising a catalyst and an ionomer, the ionomer being coated to a thickness of 5 nm or less on the surface of the catalyst.

The ionomer may be an ionomer which is coated on the surface of the catalyst by applying a low-frequency acoustic energy to an electrode forming composition comprising the catalyst and the ionomer, thereby performing resonant vibratory mixing of the electrode forming composition.

The ionomer may be coated to a thickness of 5 nm or less on the surface of the catalyst in an amount of 55 to 95 wt % with respect to the total weight of the ionomer.

The ionomer may not be coated, but aggregated on the surface of the catalyst in an amount of 0 to 45 wt % with respect to the total weight of the ionomer.

The catalyst may comprise catalytic metal particles alone or catalytic metal particles supported on a support.

A weight ratio (I/C ratio) of the ionomer to the support represented by the following mathematical equation 1 may be 0.75 to 1.6:

$$I/C \text{ ratio} = W_I/W_C \quad \text{[Mathematical Equation 1]}$$

$W_I$=total weight of the ionomer
$W_C$=total weight of the support

A membrane-electrode assembly according to another embodiment of the present invention is provided, the membrane-electrode assembly comprising an anode electrode and a cathode electrode which are positioned to face each other and an ion exchange membrane which is positioned between the anode electrode and the cathode electrode, any one selected from the group consisting of the anode electrode, the cathode electrode, and both thereof including the electrode.

A fuel cell including the membrane-electrode assembly according to another embodiment of the present invention is provided.

A method of manufacturing an ionomer-coated carbon structure according to another embodiment of the present invention is provided, the method comprising a step of preparing a mixture comprising a carbon structure and an ionomer and a step of applying a low-frequency acoustic energy to the mixture, thereby performing resonant vibratory mixing of the mixture to coat the ionomer on the surface of the carbon structure.

The carbon structure may be any one selected from the group consisting of carbon nanotube, carbon nanowire, graphene, graphene oxide, carbon black, nano-structured carbon, porous carbon, and mixtures thereof.

The low-frequency acoustic energy may have a frequency of 10 to 100 Hz.

The resonant vibratory mixing may be performed by applying an accelerated velocity of 10 to 100 G to a container containing the mixture of the carbon structure and the ionomer under the frequency.

The resonant vibratory mixing may be performed for 30 seconds to 30 minutes.

The mixture may further comprise a solvent.

An ionomer-coated carbon structure according to another embodiment of the present invention is provided, the ionomer-coated carbon structure comprising a carbon structure and an ionomer, the ionomer being coated to a thickness of 5 nm or less on the surface of the carbon structure.

The carbon structure may be selected from the group consisting of carbon nanotube, carbon nanowire, graphene, graphene oxide, carbon black, nano-structured carbon, porous carbon, and mixtures thereof.

The ionomer may be coated on the surface of the carbon structure by applying a low-frequency acoustic energy to the mixture comprising the carbon structure and the ionomer, thereby performing the resonant vibratory mixing of the mixture.

The ionomer may be coated to a thickness of 5 nm or less on the surface of the carbon structure in an amount of 60 to 100 wt % with respect to the total weight of the ionomer.

The ionomer may not be coated, but aggregated on the surface of the carbon structure in an amount of 0 to 40 wt % with respect to the total weight of the ionomer.

A weight ratio (I/C ratio) of the ionomer to the carbon structure represented by the following mathematical equation 2 may be 0.75 to 1.6:

$$I/C \text{ ratio} = W_I/W_C \quad \text{[Mathematical Equation 2]}$$

$W_I$=total weight of the ionomer
$W_C$=total weight of the carbon structure

Advantageous Effects

The present invention increases utilization ratio of the catalyst and the ionomer to improve various performances and increases coupling efficiency between the catalyst and the ionomer such that durability can be enhanced by coating an ionomer to a nanometer thickness on the surface of a catalyst to increase dispersibility of the catalyst or the like, thereby facilitating a mixing process and enabling the ionomer to be uniformly distributed on the surface of the catalyst.

Further, the present invention increases utilization ratio of the carbon structure and the ionomer to improve various performances and increases coupling efficiency between the carbon structure and the ionomer such that durability can be enhanced by coating an ionomer to a nanometer thickness on the surface of a carbon structure to increase dispersibility of the carbon structure, thereby facilitating a mixing process, increasing dispersion stability and enabling the ionomer to be uniformly distributed on the surface of the carbon structure.

DESCRIPTION OF DRAWINGS

FIG. 1 is a mimetic diagram illustrating a process of coating an ionomer on the surface of a catalyst.

FIG. 2 is a cross-sectional view schematically illustrating a membrane-electrode assembly according to an embodiment of the present invention.

FIG. 3 is a mimetic diagram illustrating an overall configuration of a fuel cell according to an embodiment of the present invention.

FIG. 4 is a mimetic diagram illustrating a process of coating an ionomer on the surface of a carbon structure.

FIG. 5 and FIG. 6 are each a transmission electron microscope (TEM) photograph of electrodes manufactured in Example 1-1 and Comparative Example 1-1 of the present invention.

FIG. 7 is a graph showing performance evaluation results of membrane-electrode assemblies manufactured in Example 1-1 and Comparative Example 1-1 of the present invention.

FIG. 8 is a transmission electron microscope (TEM) photograph of an ionomer-coated carbon structure manufactured in Example 2-1 of the present invention.

FIG. 9 is a transmission electron microscope (TEM) photograph of an ionomer-mixed carbon structure manufactured in Comparative Example 2-1 of the present invention.

BEST MODE FOR CARRYING OUT THE INVENTION

Hereinafter, embodiments of the present invention will be described in detail. However, these embodiments are only exemplary, the present invention is not limited thereto, and the present invention will only be defined by the scope of the appended claims.

Unless particularly stated otherwise in the specification, it will be understood that, when a portion of a layer, film, region, plate or others is referred to as being 'on' other portion thereof, it can be 'directly on' the other portion thereof, or another portion may also be interposed therebetween.

A method of manufacturing an electrode according to an embodiment of the present invention comprises a step of preparing an electrode forming composition comprising a catalyst and an ionomer, a step of applying a low-frequency acoustic energy to the electrode forming composition, thereby resonant vibratory mixing the electrode forming composition to coat the ionomer on the surface of the catalyst, and a step of coating the electrode forming composition to manufacture an electrode.

First of all, an electrode forming composition comprising a catalyst and an ionomer is prepared.

Any catalyst which can be used as a catalyst in a hydrogen oxidation reaction or an oxygen reduction reaction may be used as the catalyst, and a platinum-based metal is preferably used as the catalyst.

The platinum-based metal may include one selected from the group consisting of platinum (Pt), palladium (Pd), ruthenium (Ru), iridium (Ir), osmium (Os), a platinum-M alloy (M is one or more selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La) and rhodium (Rh)), and combinations thereof, and more preferably combinations of two or more metals selected from the platinum-based catalyst metal group. However, the platinum-based metal is not limited thereto, and the platinum-based catalyst metal may be used without limitation if the platinum-based metal is a platinum-based catalyst metal usable in the art.

Further, the catalyst may include a metal itself (black) or a catalyst metal supported on a support.

The support may be selected from a carbon-based support, porous inorganic oxides such as zirconia, alumina, titania, silica, ceria and the like, zeolite, and others. The carbon-based support may be selected from super P, carbon fiber, carbon sheet, carbon black, Ketjen black, acetylene black, carbon nanotube (CNT), carbon sphere, carbon ribbon, fullerene, activated carbon, and combinations of one or more thereof. However, the carbon-based support is not limited thereto, and the support may be used without limitation if the carbon-based support is a support usable in the art.

The catalytic metal particles may be positioned on the surface of the support, and may be penetrated into the support while filling internal pores of the support.

When the catalyst includes a precious metal supported on the support, the catalyst may include a commercially available catalyst on the market or a catalyst produced by supporting the precious metal on the support. Since the process of supporting the precious metal on the support is well-known in this related field, the process will be readily understood by those skilled in the art although detailed descriptions thereof will be omitted in this specification.

The catalytic metal particles may be contained in an amount of 20 to 80 wt % with respect to the total weight of the catalyst. There may be a problem that catalyst activity is lowered when the catalytic metal particles are contained in an amount of less than 20 wt %, and the catalyst activity may be inversely lowered as active area is reduced by agglomeration of the catalytic metal particles when the catalytic metal particles are contained in an amount of more than 80 wt %.

The catalyst may be contained in an amount of 50 to 80 wt % with respect to the total weight of the electrode. There may be a problem that catalyst activity is lowered by a lack of the catalyst when the catalyst is contained in an amount of less than 50 wt %, and the catalyst may be unfavorable to production of the electrode as viscosity is increased, or the catalyst may be unfavorable to ion conduction as the ionomer is insufficient when the catalyst is contained in an amount of more than 80 wt %.

On the other hand, the ionomer may be a cationic conductor having a cation exchange group such as proton, or an anionic conductor having an anion exchange group such as a hydroxy ion, carbonate or bicarbonate.

The cation exchange group may be any one selected from the group consisting of a sulfonic acid group, a carboxyl group, a boronic acid group, a phosphoric acid group, an imide group, a sulfoneimide group, a sulfoneamide group and combinations thereof, and may generally be the sulfonic acid group or the carboxyl group.

The cationic conductor may include: a fluoro-based polymer which includes the cation exchange group and has fluorine included in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyethersulfone, polycarbonate, polystyrene, polyphenylene sulfide, polyether ether ketone, polyether ketone, polyarylethersulfone, polyphosphazene, polyphenylquinoxaline, or the like; a partially fluorinated polymer such as a polystyrene-graft-ethylene-tetrafluoroethylene copolymer, a polystyrene-graft-polytetrafluoroethylene copolymer, or the like; sulfonimide; and the like.

More specifically, when the cationic conductor is a hydrogen ion cationic conductor, the polymers may have a cation exchange group selected from the group consisting of a sulfonic acid group, a carboxylic acid group, a phosphoric acid group, a phosphonic acid group, and derivatives thereof included in side chains thereof. Although specific examples of the polymers may include: fluoro-based polymers comprising a tetrafluoroethylene-fluorovinyl ether copolymer including poly(perfluorosulfonic acid), polyperfluorocarboxylic acid and sulfonic acid groups, defluorinated polyetherketone sulfide, or a mixture thereof; and hydrocarbon-based polymers comprising sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof, the polymers are not limited thereto.

Further, the cationic conductor may replace H with Na, K, Li, Cs or tetrabutylammonium at the cation exchange group of side chain terminals. When NaOH is replaced with tetrabutyl ammonium during the preparation of a catalyst composition if H is replaced with Na at the cation exchange group of the side chain terminals, a replacement process is performed using tetrabutylammonium hydroxide, and K, Li or Cs can also be replaced using appropriate compounds. Since the replacement process is well-known in this related field, detailed descriptions thereof will be omitted in this specification.

The cationic conductor can be used singularly or in a combination, and the cationic conductor may be selectively used along with a non-conductive compound to further improve adhesive strength with an ion exchange membrane. It is preferable to use the usage amount-adjusted cationic conductor by adjusting the usage amount of the cationic conductor to be suitable for the purpose of use.

The non-conductive compound may include one or more selected from the group consisting of polytetrafluoroethylene (PTFE), tetrafluoroethylene-hexafluoropropylene copolymer (FEP), tetrafluoroethylene-perfluoroalkylvinylether copolymer (PFA), ethylene tetrafluoroethylene (ETFE), ethylene-chlorotrifluoroethylene copolymer (ECTFE), polyvinylidene fluoride, poly(vinylidene fluoride-hexafluoropropylene) copolymer (PVdF-HFP), dodecylbenzene sulfonic acid, and sorbitol.

The anionic conductor, as a polymer which can transfer anions such as the hydroxy ion, carbonate or bicarbonate, is commercially available in the form of a hydroxide or a halide (generally chloride), and the anionic conductor can be used in industrial water purification, metal separation or catalytic process, and the like.

The anionic conductor may generally include metal hydroxide-doped polymers, and may specifically include metal hydroxide-doped poly(ether sulfone), polystyrene, vinyl based polymer, poly(vinyl chloride), poly(vinylidene fluoride), poly(tetrafluoroethylene), poly(benzimidazole) or poly(ethylene glycol), and the like.

Commercially available examples of the ionomer may include Nafion, Aquivion, and the like.

The ionomer may be contained in an amount of 20 to 50 wt % with respect to the total weight of the electrode. When the ionomer is contained in an amount of less than 20 wt %, generated ions may not be transferred well. When the ionomer is contained in an amount of more than 50 wt %, it is difficult to supply hydrogen or oxygen (air), and activation area for enabling a reaction process to be performed may be reduced since pores are insufficient.

Specifically, the electrode forming composition may be prepared by adding the catalyst to the ionomer or adding the ionomer to the catalyst, and it is not necessary to mix the electrode forming composition prepared after performing the adding process. However, it is possible to mix the electrode forming composition by a general mixing method before performing the resonant vibratory mixing. At this time, the general mixing method may include one or more dispersion methods selected from ultrasonic dispersion, stirring, 3-roll mill, ball mill, planetary agitation, high pressure dispersion, and mixed methods thereof.

The electrode forming composition may further comprise a solvent together with the catalyst and the ionomer. At this time, a method of preparing the electrode forming composition may comprise a process of adding the catalyst to the solvent to prepare a catalyst solution and adding the ionomer to the catalyst solution, a process of adding the ionomer to the solvent to prepare an ionomer solution and adding the catalyst to the ionomer solution, or a process of mixing the catalyst solution with the ionomer solution.

The solvent may be a solvent selected from the group consisting of water, a hydrophilic solvent, an organic solvent, and mixtures of one or more thereof.

Examples of the hydrophilic solvent may be solvents having one or more functional groups selected from the group consisting of alcohol, ketone, aldehyde, carbonate, carboxylate, carboxylic acid, ether and amide having a $C_1$-$C_{12}$ linear or branched saturated or unsaturated hydrocarbon included as a main chain thereof, and the solvents may have an alicyclic or aromatic cyclo compound included as at least a portion of the main chain thereof. Specific examples of the hydrophilic solvent may include: alcohol such as methanol, ethanol, isopropyl alcohol, ethoxy ethanol, n-propyl alcohol, butyl alcohol, 1,2-propanediol, 1-pentanol, 1,5-pentanediol, 1,9-nonanediol, or the like; ketone such as heptanone, octanone, or the like; aldehyde such as benzaldehyde, tolualdehyde, or the like; ester such as methyl pentanoate, ethyl 2-hydroxypropanoate, or the like; carboxylic acid such as pentanoic acid, heptanoic acid, or the like; ether such as methoxybenzene, dimethoxypropane, or the like; and amide such as propaneamide, butylamide, dimethyl acetamide, or the like.

The organic solvent may be selected from N-methylpyrrolidone, dimethyl sulfoxide, tetrahydrofuran, and mixtures thereof.

The solvent may be contained in an amount of 80 to 95 wt % with respect to the total weight of the electrode forming composition. There may be a cracking problem generated during coating of the electrode or a dispersion problem due to high viscosity since a solid content of the solvent is too high when the solvent is contained in an amount of less than 80 wt %. The solvent may be unfavorable in electrode activity when the solvent is contained in an amount of more than 95 wt %.

Next, resonant vibratory mixing of the electrode forming composition is performed to coat the ionomer on the surface of the catalyst.

The resonant vibratory mixing is a mixing process in which mixing is resonant vibrated, wherein the resonant vibration of mixing may occur as a result of a combination of vibration and acceleration of mixing components. When the resonant vibratory mixing is performed, uniform mixing can be carried out on the whole by generating a plurality of strong mixing zones with a diameter of about 50 μm, thereby removing a dead-zone.

Since the resonant vibratory mixing does not need parts required for performing a stirring operation such as an impeller and the like, the resonant vibratory mixing can minimize pollution, can reduce loss, has a usable viscosity range of 1 cP to 1,000,000 cP or more, and can also adjust vacuum or temperature.

Examples of a commercially available device capable of performing the resonant vibratory mixing may include a resonant acoustic mixer (RAM) of Resodyn® Corporation, and others.

After finding that the ionomer can be coated to a nanometer thickness of 5 nm or less on the surface of the catalyst using the resonant vibratory mixing, inventors of the present invention have completed the present invention.

FIG. 1 is a mimetic diagram illustrating a process of coating the ionomer on the surface of the catalyst. Referring to FIG. 1, the ionomer 3 is coated to a nanometer thickness on the surface of catalytic metal particles 2 supported on a support 1 by the resonant vibratory mixing. Namely, the ionomer 3 with a softer form may be coated on the surface of the catalytic metal particles 2 with a harder structure using the resonant vibratory mixing.

To this end, the resonant vibratory mixing may be performed by applying a low-frequency acoustic energy. The low-frequency acoustic energy is a linear or spherical surface energy propagation through a media type within a frequency range of 10 to 20,000 Hz. In the present invention, a low-frequency acoustic energy having a frequency range of 10 to 100 Hz, specifically 50 to 70 Hz is used as the low-frequency acoustic energy so as to coat the ionomer to a nanometer thickness on the surface of the catalyst.

Further, the resonant vibratory mixing may be carried out by applying an accelerated velocity of 10 to 100 G, specifically 40 to 100 G to the electrode forming composition comprising the catalyst and the ionomer under the frequency range. Herein, G means gravitational acceleration, and for example, 10 G means 10 times of the gravitational acceleration.

When the accelerated velocity is less than 10 G, a non-mixing zone may exist, and a coating process is not performed to result in performance deterioration. When the accelerated velocity is more than 100 G, there may be a problem such as mixing condition change, performance reduction, flooding or the like due to a phenomenon that ionomers are agglomerated by themselves, phase separation, or heating.

A method for applying the low-frequency acoustic energy within the frequency range and the accelerated velocity to the electrode forming composition is not particularly limited in the present invention, but may include any methods which have conventionally been known. For example, when the resonant acoustic mixer of Resodyn® Corporation is used, the method comprises supplying the acoustic energy by periodic linear displacement of a container having a mixture of the catalyst and the ionomer filled therein and using disposition of a plurality of mechanical or electronic transducers to supply the acoustic energy, and more specifically comprises using the resonant acoustic mixer including oscillator drives which move vibration and acceleration to the container and a variable elastic member such as a spring. The description of the resonant acoustic mixer may be referred to U.S. Pat. No. 7,188,993, U.S. Patent Publication No. 2010-0294113, or others.

The resonant vibratory mixing may be performed for 30 seconds to 30 minutes, specifically for a short time of 1 minute to 10 minutes. The resonant vibratory mixing may be less performed, or coating characteristics can not be confirmed when the resonant vibratory mixing is performed for less than 30 seconds, and a sample or a composition may be changed when the resonant vibratory mixing is performed for more than 30 minutes.

Further, the resonant vibratory mixing enables mixing of a wide range of materials such as solid-solid, solid-liquid, liquid-liquid, liquid-gas or the like. Therefore, when the resonant vibratory mixing is used, it is possible to perform solid-solid mixing in which the electrode forming composition includes the catalyst and the ionomer only without including the solvent, and it is also possible to perform solid-liquid mixing or liquid-liquid mixing in which the electrode forming composition includes the catalyst, the ionomer, and the solvent contained in both of the catalyst and the ionomer.

Finally, the electrode forming composition is coated to manufacture an electrode.

A step of manufacturing the electrode is not particularly limited in the present invention. However, as a specific example, the step of manufacturing the electrode may further comprise a step of coating the electrode forming composition on a release film to manufacture the electrode and transferring the electrode onto an ion exchange membrane.

When the electrode forming composition is coated on the release film, it is preferable to uniformly coat the electrode forming composition to a dry thickness of 10 to 200 μm on the release film after continuously or intermittently transferring an electrode forming composition comprising the catalyst to a coater.

More specifically, after continuously transferring the electrode forming composition to a coater such as a die coater, a gravure coater, a bar coater, a comma coater, or the like through a pump according to viscosity of the electrode forming composition, the electrode forming composition is uniformly coated to form an electrode layer with a dry thickness of 1 to 200 μm, more preferably 10 to 100 μm, on a decal film by a method of slot die coating, bar coating, comma coating, screen printing, spray coating, doctor blade coating, bush, or the like, and the electrode forming composition coated on the decal film passes through a drying furnace which is maintained to a predetermined temperature to volatilize a solvent.

Activities may be lowered since the catalyst has a low content when the electrode forming composition is coated to a thickness of less than 1 μm, and resistance may be increased since moving distances of ions and electrons are increased when the electrode forming composition is coated to a thickness of more than 200 μm.

The drying process may be performed at a drying temperature of 25 to 90° C. for a drying time of 12 hours or more. A problem that a sufficiently dried electrode cannot be formed may be generated when the drying temperature is less than 25° C., and when the drying time is less than 12 hours. Cracking or the like of the electrode may be generated when the drying process is performed at a drying temperature of more than 90° C.

However, methods of coating and drying the electrode forming composition are not limited to the above-described methods.

Optionally, the method of manufacturing the electrode may further comprise a step of cutting the dried electrode and release film to a required size to bond the cut electrode to the ion exchange membrane after performing the step of drying the electrode forming composition to obtain a dried electrode.

The ion exchange membrane includes an ionic conductor. The ionic conductor may be a cationic conductor having a cation exchange group such as proton, or an anionic conductor having an anion exchange group such as a hydroxy ion, carbonate or bicarbonate.

The cation exchange group may be any one selected from the group consisting of a sulfonic acid group, a carboxyl group, a boronic acid group, a phosphoric acid group, an imide group, a sulfoneimide group, a sulfoneamide group and combinations thereof, and may generally be the sulfonic acid group or the carboxyl group.

The cationic conductor may include: a fluoro-based polymer which includes the cation exchange group and has fluorine included in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyethersulfone, polycarbonate, polystyrene, polyphenylene sulfide, polyether ether ketone, polyether ketone, polyarylethersulfone, polyphosphazene, polyphenylquinoxaline, or the like; a partially fluorinated polymer such as a polystyrene-graft-ethylene-tetrafluoroethylene copolymer, a polystyrene-graft-polytetrafluoroethylene copolymer, or the like; sulfonimide; and the like.

More specifically, when the cationic conductor is a hydrogen ion cationic conductor, the polymers may have a cation exchange group selected from the group consisting of a sulfonic acid group, a carboxylic acid group, a phosphoric acid group, a phosphonic acid group, and derivatives thereof included in a side chain thereof. Although specific examples of the polymers may include: fluoro-based polymers comprising a tetrafluoroethylene-fluorovinyl ether copolymer including poly(perfluorosulfonic acid), polyperfluorocarboxylic acid and sulfonic acid groups, defluorinated polyetherketone sulfide, or a mixture thereof; and hydrocarbon-based polymers comprising sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof, the polymers are not limited thereto.

The anionic conductor, as a polymer which can transfer an anion such as a hydroxy ion, carbonate or bicarbonate, is commercially available in the form of a hydroxide or a halide (generally chloride), and the anionic conductor can be used in industrial water purification, metal separation or catalytic process, and the like.

The anionic conductor may generally include metal hydroxide-doped polymers, and may specifically include metal hydroxide-doped poly(ether sulfone), polystyrene, vinyl based polymer, poly(vinyl chloride), poly(vinylidene fluoride), poly(tetrafluoroethylene), poly(benzimidazole) or poly(ethylene glycol), and the like.

On the other hand, the ion exchange membrane may be formed in the form of a reinforced membrane in which the ionic conductor is filled in pores of a fluorine-based porous support such as e-PTFE, a porous nanoweb support manufactured by electrospinning or the like, and others.

A method of bonding the electrode to the ion exchange membrane may comprise using a transfer method as an example, and the transfer method may be performed by a hot pressing process of applying heat and pressure to a metal press alone or the metal press over which a soft board of rubber material such as silicone rubber material or the like is put.

The transfer method may be performed under conditions of 80 to 150 r and 50 to 200 kgf/cm². Transferring of the electrode onto the release film may not be properly achieved when the hot pressing process is performed under conditions of less than 80 r and less than 50 kgf/cm², there is a concern that structural change of the electrode may occur as polymer of the ion exchange membrane is burnt when the hot pressing process is performed at a condition of more than 150° C., and transferring may not be properly achieved as an effect of pressing the electrode is more increased than that of transferring the electrode when the hot pressing process is performed at a condition of more than 200 kgf/cm².

An electrode according to other embodiment of the present invention may be manufactured by the above-described method of manufacturing the electrode. Therefore, the electrode comprises a catalyst and an ionomer, and the ionomer is coated on the surface of the catalyst by applying a low-frequency acoustic energy to an electrode forming composition comprising the catalyst and the ionomer, thereby performing resonant vibratory mixing of the electrode forming composition to form an ionomer coating layer. At this time, the ionomer coating layer may have a nanometer thickness of 5 nm or less, specifically 0.5 to 4 nm. When the ionomer coating layer has a thickness of 5 nm or less, the ionomer coating layer is preferable in the aspect of improving performance of the catalyst.

Further, when the ionomer is coated on the surface of the catalyst using the resonant vibratory mixing, ionomer aggregation layers with various thicknesses may be remarkably reduced.

When the catalyst and the ionomer are mixed by conventional other methods, the ionomer aggregation layers with various thicknesses are formed. However, when the ionomer is coated on the surface of the catalyst using the resonant vibratory mixing, an ionomer layer which is coated to form a thickness of 5 nm or less of the catalyst can be almost uniformly formed on the entire area of the electrode.

The ionomer may be coated to a thickness of 5 nm or less on the surface of the catalyst in an amount of 55 to 95 wt %, specifically 80 to 90 wt %, with respect to the total weight of the ionomer. There may be problems including performance reduction due to non-coated portions, stability reduction according to connection restriction between catalyst-ionomer assemblies, and the like when the ionomer is coated to a thickness of 5 nm or less on the surface of the catalyst in an amount of less than 55 wt %, and catalyst activity may be lowered by aggregation of the ionomer when the ionomer is coated to a thickness of 5 nm or less on the surface of the catalyst in an amount of more than 95 wt %.

Further, an ionomer agglomeration layer formed of an ionomer which is agglomerated without being coated on the surface of the catalyst may have an amount of 0 to 45 wt %, specifically 10 to 20 wt %, with respect to the total weight of the ionomer. When the ionomer agglomeration layer has an amount of more than 45 wt % with respect to the total weight of the ionomer, catalyst activity may be lowered by ionomer agglomeration and non-coated catalyst.

The ionomer coated to a thickness of 5 nm or less on the surface of the catalyst means an ionomer having a thickness of 5 nm or less when observing the electrode with a transmission electron microscope (TEM) or a scanning transmission electron microscope (STEM), and the ionomer which is agglomerated without being coated on the surface of the catalyst means that the agglomerated ionomer has a thickness of more than 5 nm when observing the electrode with the TEM or the STEM, and the agglomerated ionomer is observed by the TEM, the STEM, or a scanning electron microscope (SEM). Further, the ionomer may comprise a remaining amount of an ionomer except for the ionomer coated to a thickness of 5 nm or less on the surface of the catalyst and the ionomer which is agglomerated without being coated on the surface of the catalyst. The amount of the ionomer coated to a thickness of 5 nm or less on the surface of the catalyst or the amount of the agglomerated ionomer may be an amount value measured with respect to the total of the electrode, or may be obtained by calculating an average value thereof after measuring the amount of the ionomer coated to a thickness of 5 nm or less on the surface of the catalyst and the amount of the agglomerated ionomer existing on a TEM or SEM photograph with respect to at least any five points of the electrode.

In addition, when the ionomer is a fluorine-based ionomer, distribution of the ionomer enables coated and non-coated areas to be confirmed by detection of fluorine (F) when analyzing a catalyst coated with the ionomer by an energy dispersive X-ray spectroscope (EDS) under TEM or SEM analysis conditions.

Moreover, when the ionomer comprises a sulfonic acid group as an ion exchange group, detection of sulfur (S) can confirm distribution of the ionomer, and the distribution of the ionomer enables the coated and non-coated areas to be confirmed when analyzing the catalyst coated with the ionomer by the energy dispersive X-ray spectroscope (EDS) under the TEM or SEM analysis conditions.

Thus, since the ionomer is uniformly coated on the surface of the catalyst, a large amount of the ionomer is required compared to conventional other methods. Specifically, a weight ratio (I/C ratio) of the ionomer to the support of the catalyst represented by the following mathematical equation 1 may be 0.75 to 1.6. It may be seen that the I/C ratio of the ionomer to the support of the catalyst has been improved as much as 0.05 to 0.2 compared to an existing electrode. The existing electrode, as an electrode which does not include an ionomer coating layer of 5 nm or less, may be manufactured using an existing mixing method such as ball mill or the like.

$$I/C\ ratio = W_I/W_C \qquad \text{[Mathematical Equation 1]}$$

$W_I$=total weight of the ionomer
$W_C$=total weight of the support

Further, the electrode may represent 1 to 30% performance improvement, specifically 5 to 20% performance improvement, of electrochemical active surface area (ECSA) compared to an existing electrode. The electrochemical active surface area can be measured by measuring cyclo-voltammetry using a rotating disk electrode, thereby obtaining a hydrogen oxidation reaction area. The existing electrode, as an electrode which does not include an ionomer coating layer of 5 nm or less, may be manufactured using an existing mixing method such as ball mill or the like.

A membrane-electrode assembly according to another embodiment of the present invention comprises an anode electrode and a cathode electrode which are positioned to face each other and the ion exchange membrane which is positioned between the anode electrode and the cathode electrode. Any one selected from the group consisting of the anode electrode, the cathode electrode, and both thereof may include an electrode according to an embodiment of the present invention. Repeated descriptions of the electrode and the method of manufacturing the electrode will be omitted since the descriptions about the electrode and the method of manufacturing the electrode are the same as described above.

FIG. 2 is a cross-sectional view schematically showing the membrane-electrode assembly. Referring to FIG. 2, the membrane-electrode assembly 100 comprises the ion exchange membrane 50, and the electrodes 20 and 20' which are each disposed on both surfaces of the ion exchange membrane 50. The electrodes 20 and 20' include electrode substrates 40 and 40', and catalyst layers 30 and 30' which are formed on the surface of the electrode substrates 40 and 40', and the electrodes 20 and 20' may additionally include a microporous layer (not shown) containing conductive fine particles of carbon powder, carbon black or the like for facilitating material diffusion in the electrode substrates 40 and 40' between the electrode substrates 40 and 40' and the catalyst layers 30 and 30'.

In the membrane-electrode assembly 100, an electrode 20 which is disposed on one surface of the ion exchange membrane 50 and causes an oxidation reaction of generating hydrogen ions and electrons from a fuel that is transferred to the catalyst layer 30 after passing through the electrode substrate 40 is referred to as an anode electrode, and an electrode 20' which is disposed on the other surface of the ion exchange membrane 50 and causes a reduction reaction of generating water from an oxidizer that is transferred to the catalyst layer 30' after passing through the hydrogen ions and the electrode substrate 40' received through the ion exchange membrane 50 is referred to as a cathode electrode.

The catalyst layers 30 and 30' of the anode and cathode electrodes 20 and 20' include an electrode according to an embodiment of the present invention comprising the catalyst, the ionomer, and polyacrylic acid.

The electrode substrates 40 and 40' may include porous conductive substrates such that hydrogen or oxygen can be smoothly supplied. Although typical examples of the electrode substrates 40 and 40' may include carbon paper, carbon cloth, carbon felt and metal cloth (a porous film composed of a metal cloth in the fiber state, or a metal film formed on the surface of a cloth composed of polymer fibers), the typical examples of the electrode substrates 40 and 40' are not limited thereto. Further, it is preferable that the electrode substrates 40 and 40' include electrode substrates which are water repellent-treated with a fluorine-based resin since the water repellent-treated electrode substrates can prevent deterioration of reactant diffusion efficiency due to water generated when a fuel cell is driven. The fluorine-based resin may include polytetrafluoroethylene, polyvinylidene fluoride, polyhexafluoropropylene, polyperfluoroalkylvinylether, polyperfluorosulfonylfluoride alkoxy vinyl ether, fluorinated ethylene propylene, polychlorotrifluoroethylene, or copolymers thereof.

The membrane-electrode assembly 100 may be manufactured by an ordinary method of manufacturing a membrane-electrode assembly except that the electrode according to the present invention is used as the anode electrode 20 or the cathode electrode 20'.

A fuel cell according to another embodiment of the present invention includes the membrane-electrode assembly.

FIG. 3 is a mimetic diagram illustrating an overall configuration of the fuel cell.

Referring to FIG. 3, the fuel cell 200 includes a fuel supply unit 210 which supplies a mixed fuel having a fuel and water mixed therein, a reforming unit 220 which reforms the mixed fuel to generate a hydrogen gas-containing reformed gas, a stack 230 which generates electric energy by making the hydrogen gas-containing reformed gas supplied from the reforming unit 220 perform an electrochemical reaction with an oxidizer, and an oxidizer supply unit 240 which supplies the oxidizer to the reforming unit 220 and the stack 230.

The stack 230 includes a plurality of unit cells which generate electric energy by inducing an oxidation/reduction reaction of the hydrogen gas-containing reformed gas supplied from the reforming unit 220 and the oxidizer supplied from the oxidizer supply unit 240.

Each of the unit cells means an electricity-generating unit cell, and includes the membrane-electrode assembly which oxidizes or reduces the hydrogen gas-containing reformed gas and oxygen in the oxidizer, and separators (or called as bipolar plates, and hereinafter, referred to as "separators") for supplying the hydrogen gas-containing reformed gas and the oxidizer to the membrane-electrode assembly. The separators are disposed at both sides of the membrane-electrode assembly positioned at the center. In this case, separators which are each positioned at an outermost side of the stack may particularly be referred to as end plates.

One end plate out of the separators includes a first supply pipe 231 having a pipe shape for injecting the hydrogen gas-containing reformed gas supplied from the reforming unit 220 and a second supply pipe 232 having a pipe shape for injecting an oxygen gas, and the other end plate out of the separators includes a first discharge pipe 233 for discharging a hydrogen gas-containing reformed gas that has finally been unreacted and remained in the plurality of unit cells to the outside and a second discharge pipe 234 for discharging an oxidizer that has finally been unreacted and remained in the unit cells to the outside.

The electrode can be applied to various fields such as secondary batteries, capacitors, and the like in addition to the above-described membrane-electrode assembly for the fuel cell.

A method of manufacturing an ionomer-coated carbon structure according to another embodiment of the present invention comprises a step of preparing a mixture comprising a carbon structure and an ionomer and a step of applying a low-frequency acoustic energy to the mixture, thereby performing resonant vibratory mixing of the mixture to coat the ionomer on the surface of the carbon structure.

First, a mixture comprising a carbon structure and an ionomer is prepared.

The carbon structure is a structure having various shapes formed of carbon, and types of the carbon structure are not particularly limited in the present invention.

The carbon structure may have a micrometer to nanometer size, and is not limited to a specific size or shape.

A specific example of the carbon structure may include any one selected from the group consisting of carbon nanotube (CNT), carbon nanowire, graphene, graphene oxide, carbon black, nano-structured carbon, porous carbon, and mixtures thereof.

Meanwhile, a repeated description of the ionomer is omitted since the description about the ionomer is the same as described above.

It is preferable to determine an injection amount of the ionomer by considering specific surface area of the carbon structure, and the ionomer may be normally contained in an amount of 30 to 200 parts by weight, specifically 50 to 150 parts by weight. A portion which is not coated with the ionomer may exist in the carbon structure when the ionomer is contained in an amount of less than 30 parts by weight, and an agglomeration part between the ionomers may be generated by an excessive amount of the ionomer when the ionomer is contained in an amount of more than 200 parts by weight.

Specifically, the mixture may be prepared by adding the carbon structure to an ionomer or adding the ionomer to the carbon structure, and it is not necessary to mix the mixture prepared after performing the adding process. However, it is possible to mix the mixture by a general mixing method before performing the resonant vibratory mixing. At this time, the general mixing method may include one or more dispersion methods selected from ultrasonic dispersion, stirring, 3-roll mill, ball mill, planetary agitation, high pressure dispersion, and mixed methods thereof.

The mixture may further comprise a solvent together with the carbon structure and the ionomer. At this time, a method of preparing the mixture may comprise a process of adding the carbon structure to the solvent to prepare a carbon structure solution and adding the ionomer to the carbon structure solution, a process of adding the ionomer to the solvent to prepare an ionomer solution and adding the carbon structure to the ionomer solution, or a process of mixing the carbon structure solution with the ionomer solution.

The solvent may be a solvent selected from the group consisting of water, a hydrophilic solvent, an organic solvent, and mixtures of one or more thereof. Repeated descriptions of the hydrophilic solvent and the organic solvent will be omitted since the descriptions about the hydrophilic solvent and the organic solvent are the same as described above.

The solvent may be contained in an amount of 80 to 95 wt % with respect to the total weight of the mixture. There may be a cracking problem generated during coating of an ionomer-coated carbon structure or a dispersion problem due to high viscosity since a solid content of the solvent is too high when the solvent is contained in an amount of less than 80 wt %. The solvent may be unfavorable in activity of the ionomer-coated carbon structure when the solvent is contained in an amount of more than 95 wt %.

Next, resonant vibratory mixing of the mixture is performed to coat the ionomer on the surface of the carbon structure.

The resonant vibratory mixing is a mixing process in which mixing is resonant vibrated, wherein the resonant vibration of mixing may occur as a result of a combination of vibration and acceleration of mixing components. When the resonant vibratory mixing is performed, uniform mixing can be carried out on the whole by generating a plurality of strong mixing zones with a diameter of about 50 μm, thereby removing a dead-zone.

Since the resonant vibratory mixing does not need parts required for performing a stirring operation such as an impeller and the like, the resonant vibratory mixing can minimize pollution, can reduce loss, has a usable viscosity range of 1 cP to 1,000,000 cP or more, and can also adjust vacuum or temperature.

Examples of a commercially available device capable of performing the resonant vibratory mixing may include a resonant acoustic mixer (RAM) of Resodyn® Corporation, and others.

After finding that the ionomer can be coated to a nanometer thickness of 5 nm or less on the surface of the carbon structure using the resonant vibratory mixing, inventors of the present invention have completed the present invention.

FIG. 4 is a mimetic diagram illustrating a process of coating the ionomer on the surface of the carbon structure. Referring to FIG. 4, the ionomer 13 is coated to a nanometer thickness on the surface of a carbon structure 11 by the resonant vibratory mixing. Namely, the ionomer 13 with a softer form may be coated on the surface of the carbon structure 11 with a harder structure using the resonant vibratory mixing.

To this end, the resonant vibratory mixing may be performed by applying a low-frequency acoustic energy. The low-frequency acoustic energy is a linear or spherical surface energy propagation through a media type within a frequency range of 10 to 20,000 Hz. In the present invention, a low-frequency acoustic energy having a frequency range of 10 to 100 Hz, specifically 50 to 70 Hz is used as the low-frequency acoustic energy so as to coat the ionomer to a nanometer thickness on the surface of the carbon structure.

Further, the resonant vibratory mixing may be carried out by applying an accelerated velocity of 10 to 100 G, specifically 40 to 100 G to a container containing a mixture of the carbon structure and the ionomer under the frequency range. Herein, G means gravitational acceleration, and for example, 10 G means 10 times of the gravitational acceleration.

When the accelerated velocity is less than 10 G, a non-mixing zone may exist, and a coating process may not be performed. When the accelerated velocity is more than 100 G, there may be a problem such as mixing condition change or the like due to a phenomenon that the ionomers are agglomerated by themselves, phase separation, or heating.

A repeated description of the method is omitted since the description about a method of applying a low-frequency acoustic energy within the frequency range and the accelerated velocity to the mixture is the same as described above.

The resonant vibratory mixing may be performed for 30 seconds to 30 minutes, specifically for a short time of 1 minute to 10 minutes. The resonant vibratory mixing may be less performed, or coating characteristics can not be confirmed when the resonant vibratory mixing is performed for less than 30 seconds, and a sample or a composition may be changed when the resonant vibratory mixing is performed for more than 30 minutes.

Further, the resonant vibratory mixing enables mixing of a wide range of materials such as solid-solid, solid-liquid, liquid-liquid, liquid-gas or the like. Therefore, when the resonant vibratory mixing is used, it is possible to perform solid-solid mixing in which the mixture includes the carbon structure and the ionomer only without including the solvent, and it is also possible to perform solid-liquid mixing or liquid-liquid mixing in which the mixture includes the carbon structure, the ionomer, and the solvent contained in both of the carbon structure and the ionomer.

An ionomer-coated carbon structure according to another embodiment of the present invention may be manufactured by the above-described method of manufacturing the ionomer-coated carbon structure. Therefore, the ionomer-coated carbon structure comprises a carbon structure and an ionomer, and the ionomer is coated on the surface of the carbon structure by applying a low-frequency acoustic energy to a mixture comprising the carbon structure and the ionomer, thereby performing resonant vibratory mixing of the mixture to form an ionomer coating layer. At this time, the ionomer coating layer may have a nanometer thickness of 5 nm or less, specifically 0.5 to 4 nm. When the ionomer coating layer has a thickness of 5 nm or less, the ionomer coating layer is preferable in the aspect of utilizing the carbon structure.

Further, when the ionomer is coated on the surface of the carbon structure using the resonant vibratory mixing, ionomer aggregation layers with various thicknesses may be remarkably reduced.

When the carbon structure and the ionomer are mixed by conventional other methods, a coating process may not be performed, or the ionomer aggregation layers with various thicknesses are formed. However, when the ionomer is coated on the surface of the carbon structure using the resonant vibratory mixing, an ionomer layer which is coated to form a thickness of 5 nm or less of the carbon structure can be almost uniformly formed on the entire area of the ionomer-coated carbon structure.

The ionomer is mostly used to coat the carbon structure. The ionomer may be coated to a thickness of 5 nm or less on the surface of the carbon structure in an amount of 60 to 100 wt %, specifically 85 to 95 wt %, with respect to the total weight of the ionomer. Non-coated areas may be generated when the ionomer is coated to a thickness of 5 nm or less on the surface of the carbon structure in an amount of less than 60 wt % with respect to the total weight of the ionomer, and aggregated portions of the ionomer may be generated when the ionomer is coated to a thickness of 5 nm or less on the surface of the carbon structure in an amount of more than 100 wt %.

Further, an ionomer agglomeration layer formed of an ionomer which is agglomerated without being coated on the surface of the carbon structure may have an amount of 0 to 40 wt %, specifically 1 to 15 wt %, with respect to the total weight of the ionomer. When the ionomer agglomeration layer has an amount of more than 40 wt % with respect to the total weight of the ionomer, agglomerated areas of the ionomer may be generated.

The ionomer coated to a thickness of 5 nm or less on the surface of the carbon structure means an ionomer having a thickness of 5 nm or less when observing the ionomer-coated carbon structure with a transmission electron microscope (TEM) or a scanning transmission electron microscope (STEM), and the ionomer which is agglomerated without being coated on the surface of the carbon structure means that the agglomerated ionomer has a thickness of more than 5 nm when observing the ionomer-coated carbon structure with the TEM or the STEM, and the agglomerated ionomer is observed by the TEM, the STEM, or a scanning electron microscope (SEM). Further, the ionomer may comprise a remaining amount of an ionomer except for the ionomer coated to a thickness of 5 nm or less on the surface of the carbon structure and the ionomer which is agglomerated without being coated on the surface of the carbon structure. The amount of the ionomer coated to a thickness of 5 nm or less on the surface of the carbon structure or the amount of the agglomerated ionomer may be an amount value measured with respect to the total of the ionomer-coated carbon structure, or may be obtained by calculating an average value thereof after measuring the amount of the ionomer coated to a thickness of 5 nm or less on the surface of the carbon structure and the amount of the agglomerated ionomer existing on a TEM photograph with respect to at least any five points of the ionomer-coated carbon structure.

In addition, when the ionomer is a fluorine-based ionomer, distribution of the ionomer enables coated and non-coated areas to be confirmed by detection of fluorine (F) when analyzing the ionomer-coated carbon structure by an energy dispersive X-ray spectroscope (EDS) under TEM or SEM analysis conditions.

Moreover, when the ionomer comprises a sulfonic acid group as an ion exchange group, detection of sulfur (S) can confirm distribution of the ionomer, and the distribution of the ionomer enables the coated and non-coated areas to be confirmed when analyzing the ionomer-coated carbon structure by the energy dispersive X-ray spectroscope (EDS) under the TEM or SEM analysis conditions.

Thus, since the ionomer is uniformly coated on the surface of the carbon structure, a large amount of the ionomer is required compared to conventional other methods. Specifically, a weight ratio (I/C ratio) of the ionomer to the carbon structure represented by the following mathematical equation 2 may be 0.75 to 1.6. It may be seen that the I/C ratio of the ionomer to the carbon structure has been improved as much as 0.05 to 0.2 compared to a mixture of an existing carbon structure and the ionomer. The mixture of the existing carbon structure and the ionomer, as a mixture which does not include an ionomer coating layer of 5 nm or less, may be manufactured using an existing mixing method such as ball mill or the like.

$$I/C\ ratio = W_I/W_C$$ [Mathematical Equation 2]

$W_I$=total weight of the ionomer
$W_C$=total weight of the carbon structure

Moreover, when leaving alone the ionomer-coated carbon structure dispersed in the solvent after dispersing the ionomer-coated carbon structure in a solvent by various dispersion devices, the ionomer-coated carbon structure can exhibit dispersion stability of 0.5 to 15 days, specifically 1 to 8 days, within a range in which no layer separation is occurred with the naked eye. The ionomer-coated carbon structure exhibiting dispersion stability of less than 0.5 day means that an ionomer layer is not coated.

The ionomer-coated carbon structure can be applied as a catalyst support, an electrode material or the like in an electrochemical device field such as a fuel cell, a secondary battery, a capacitor or the like.

Mode(s) for Carrying Out the Invention

Hereinafter, the embodiments are illustrated in more detail with reference to examples. Preferred embodiments of the present invention will be described below in more detail. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Manufacturing Example 1: Manufacturing Electrodes

Example 1-1

After weighing 1.0 g of Pt/C (a product of TANAKA) and injecting the weighed 1.0 g of Pt/C into a container, 1.0 g of an ionomer powder (Nafion, a product of Dupont Corporation) was weighed and injected into the same container to obtain a mixture.

The container containing the mixture was mounted on a resonant acoustic mixer (RAM) of Resodyn® Corporation. An electrode forming composition was prepared by mixing the mixture at an accelerated velocity of 70 G for 5 minutes while applying a low-frequency acoustic energy having a frequency of 60 Hz to the resonant acoustic mixer.

After bar-coating the electrode forming composition on a polyimide release film under conditions including 10 mm/s of coating speed and 100 μm of coating thickness, the electrode forming composition bar-coated on the polyimide release film was dried at 30° C. for 6 hours to manufacture an electrode.

A membrane-electrode assembly was manufactured by hot-pressing and transferring the electrode onto the ion exchange membrane and then peeling off the release film from the electrode transferred onto the ion exchange membrane in such a manner of maintaining the electrode pressed onto the ion exchange membrane at room temperature for 1 minute after cutting the dried electrode to a required size, aligning the electrode and the ion exchange membrane such that the electrode comes in contact with both surfaces of an ion exchange membrane (a product of Dupont Corporation; Nafion 212 Membrane), and pressing the electrode onto the ion exchange membrane under heat and pressure conditions of 100° C. and 100 kgf/cm² for 5 minutes.

Example 1-2

A membrane-electrode assembly was manufactured by performing the same manufacturing process as in Example 1-1 except that the mixture was mixed at an accelerated velocity of 70 G for 10 minutes while applying a low-frequency acoustic energy having a frequency of 60 Hz to the resonant acoustic mixer in Example 1-1.

Example 1-3

A membrane-electrode assembly was manufactured by performing the same manufacturing process as in Example 1-1 except that the mixture was mixed at an accelerated velocity of 80 G for 5 minutes while applying a low-frequency acoustic energy having a frequency of 60 Hz to the resonant acoustic mixer in Example 1-1.

Example 1-4

After weighing 1.0 g of Pt/C (a product of TANAKA) and injecting the weighed 1.0 g of Pt/C into a container, 5.0 g of an ionomer solution (Nafion 20% solution, a product of Dupont Corporation) was weighed and injected into the same container to obtain a mixture.

The container containing the mixture was mounted on a resonant acoustic mixer (RAM) of Resodyn® Corporation. An electrode forming composition was prepared by mixing the mixture at an accelerated velocity of 70 G for 5 minutes while applying a low-frequency acoustic energy having a frequency of 60 Hz to the resonant acoustic mixer.

After bar-coating the electrode forming composition on a polyimide release film under conditions including 10 mm/s of coating speed and 100 μm of coating thickness, the electrode forming composition bar-coated on the polyimide release film was dried at 30° C. for 6 hours to manufacture an electrode.

A membrane-electrode assembly was manufactured by hot-pressing and transferring the electrode onto the ion exchange membrane and then peeling off the release film from the electrode transferred onto the ion exchange membrane in such a manner of maintaining the electrode pressed onto the ion exchange membrane at room temperature for 1 minute after cutting the dried electrode to a required size, aligning the electrode and the ion exchange membrane such that the electrode comes in contact with both surfaces of an ion exchange membrane (a product of Dupont Corporation; Nafion 212 Membrane), and pressing the electrode onto the ion exchange membrane under heat and pressure conditions of 100° C. and 100 kgf/cm$^2$ for 5 minutes.

Comparative Example 1-1

After weighing 1.0 g of Pt/C (a product of TANAKA) and injecting the weighed 1.0 g of Pt/C into a container, 5.0 g of an ionomer solution (Nafion 20% solution, a product of Dupont Corporation) was weighed and injected into the same container to obtain a mixture.

An electrode forming composition was prepared by dispersing and stirring the mixture using a ball mill.

After that, a membrane-electrode assembly was manufactured by performing a step of manufacturing a membrane-electrode assembly by coating the electrode forming composition on a decal film and drying the electrode forming composition coated on the decal film in the same manner as described in the foregoing Examples.

Experimental Example 1-1

Experimental Example 1-1: Observing TEM Photographs

Transmission electron microscope (TEM) photographs of the electrodes manufactured in Example 1-1 and Comparative Example 1-1 are each shown in FIG. 5 and FIG. 6.

Referring to FIG. 5 and FIG. 6, a phenomenon that an ionomer is coated on the surface of a catalyst is clearly observed from an electrode manufactured by resonant vibratory mixing as in Example 1-1, and it can be confirmed that the ionomer is coated to a thickness of 5 nm or less. Specifically, wave patterns of arrow parts A in FIG. 5 show that the ionomer is coated to a thickness of 5 nm or less to form a coated portion, and it can be confirmed that the coated portion is spread out on the whole. Further, it can be confirmed that an angglomeration phenomenon B in which the ionomer shown in Comparative Example 1-1 prepared by the ball mill is laid in layers is not observed.

Experimental Example 1-2; CV Analysis

After measuring voltages and currents outputted from electrodes with respect to membrane-electrode assemblies manufactured in Example 1-1 and Comparative Example 1-1 and comparative evaluating output characteristics (discharge performance) of voltage-current density outputted therefrom to obtain measurement and comparative evaluation results, the measurement and comparative evaluation results are shown in FIG. 7.

Referring to FIG. 7, it can be confirmed that the membrane-electrode assembly manufactured in the Example has superior voltage performance according to current density that the membrane-electrode assembly manufactured in the Comparative Example. Thus, it can be confirmed that the electrode manufactured in the Example exhibits a larger electrochemical effective surface area than the electrode manufactured in the Comparative Example, i.e., activity of a catalyst is increased.

Manufacturing Example 2: Manufacturing Ionomer-Coated Carbon Structures

Example 2-1

After weighing 1.0 g of a carbon nanotube and injecting the weighed 1.0 g of the carbon nanotube into a container, 0.2 g of an ionomer powder (Nafion, a product of Dupont Corporation) was weighed and injected into the same container to obtain a mixture.

The container containing the mixture was mounted on a resonant acoustic mixer (RAM) of Resodyn® Corporation. An ionomer-coated carbon structure was manufactured by mixing the mixture at an accelerated velocity of 70 G for 5 minutes while applying a low-frequency acoustic energy having a frequency of 60 Hz to the resonant acoustic mixer.

Example 2-2

An ionomer-coated carbon structure was manufactured by performing the same manufacturing process as in Example 2-1 except that the mixture was mixed at an accelerated velocity of 70 G for 10 minutes while applying a low-frequency acoustic energy having a frequency of 60 Hz to the resonant acoustic mixer in Example 2-1.

Example 2-3

An ionomer-coated carbon structure was manufactured by performing the same manufacturing process as in Example 2-1 except that the mixture was mixed at an accelerated velocity of 80 G for 5 minutes while applying a low-frequency acoustic energy having a frequency of 60 Hz to the resonant acoustic mixer in Example 2-1.

Example 2-4

An ionomer-coated carbon structure was manufactured by performing the same manufacturing process as in Example 2-1 except that graphene as the carbon structure was used in Example 2-1.

Example 2-5

An ionomer-coated carbon structure was manufactured by performing the same manufacturing process as in Example 2-1 except that carbon black as the carbon structure was used in Example 2-1.

Example 2-6

After weighing 1.0 g of a carbon nanotube and injecting the weighed 1.0 g of the carbon nanotube into a container, 1.0 g of an ionomer solution (Nafion 20% solution, a product of Dupont Corporation) was weighed and injected into the same container to obtain a mixture.

The container containing the mixture was mounted on a resonant acoustic mixer (RAM) of Resodyn® Corporation. An ionomer-coated carbon structure was manufactured by mixing the mixture at an accelerated velocity of 70 G for 5 minutes while applying a low-frequency acoustic energy having a frequency of 60 Hz to the resonant acoustic mixer.

Comparative Example 2-1

After weighing 1.0 g of a carbon nanotube and injecting the weighed 1.0 g of the carbon nanotube into a container, 0.2 g of an ionomer powder (Nafion, a product of Dupont Corporation) was weighed and injected into the same container to obtain a mixture.

A carbon structure mixed with an ionic conductor was manufactured by dispersing and stirring the mixture using a ball mill.

Experimental Example 2-1

Experimental Example 2-1: Observing TEM Photographs

Transmission electron microscope (TEM) photographs of the ionomer-coated carbon structure manufactured in Example 2-1 and the ionomer-mixed carbon structure manufactured in Comparative Example 2-1 are each shown in FIG. 8 and FIG. 9.

Referring to FIG. 8 and FIG. 9, a phenomenon that an ionomer is coated on the surface of a carbon structure is clearly observed from an ionomer-coated carbon structure manufactured by resonant vibratory mixing as in Example 2-1, and it can be confirmed that the ionomer is coated to a thickness of 5 nm or less. Specifically, wave patterns of arrow parts A in FIG. 8 show that the ionomer is coated to a thickness of 5 nm or less to form a coated portion, and it can be confirmed that the coated portion is spread out on the whole. Further, it can be confirmed that an angglomeration phenomenon B in which the ionomer shown in Comparative Example 2-1 prepared by the ball mill is laid in layers is not observed.

Although the present invention has been described along with the accompanying drawings, this is only one of various examples including the gist of the present invention and has an object of enabling a person having ordinary skill in the art to easily practice the invention. Accordingly, it is evident that the present invention is not limited to the aforementioned examples. Accordingly, the range of protection of the present invention should be interpreted based on the following claims, and all of technological spirits within the equivalents of the present invention may fall within the range of right of the present invention by changes, substitutions and replacements without departing from the gist of the present invention. Furthermore, it is evident that the configurations of some drawings have been provided to more clearly describe configurations and have been more exaggerated or reduced than actual configurations.

DESCRIPTION OF MARKS

1: Support
2: Catalytic metal particles
3: Ionomer
11: Carbon structure
13: Ionomer
20, 20': Electrodes
30, 30': Catalyst layers
40, 40': Electrode substrates
50: Ion exchange membrane
100: Membrane-electrode assembly
200: Fuel cell
210: Fuel supply unit
220: Reforming unit
230: Stack
231: First supply pipe
232: Second supply pipe
233: First discharge pipe
234: Second discharge pipe
240: Oxidizer supply unit

INDUSTRIAL APPLICABILITY

The present invention relates to a method of manufacturing an electrode, an electrode manufactured thereby, a membrane-electrode assembly comprising the electrode and a fuel cell including the membrane-electrode assembly, wherein the method of manufacturing the electrode increases utilization ratio of the catalyst and the ionomer to improve various performances and increases coupling efficiency between the catalyst and the ionomer such that durability can be enhanced by coating an ionomer to a nanometer thickness on the surface of a catalyst to increase dispersibility of the catalyst or the like, thereby facilitating a mixing process and enabling the ionomer to be uniformly distributed on the surface of the catalyst.

Further, the present invention relates to a method of manufacturing an ionomer-coated carbon structure and an ionomer-coated carbon structure manufactured thereby, wherein the method of manufacturing the ionomer-coated carbon structure increases utilization ratio of the carbon structure and the ionomer to improve various performances and increases coupling efficiency between the carbon structure and the ionomer such that durability can be enhanced by coating an ionomer to a nanometer thickness on the surface of a carbon structure to increase dispersibility of the carbon structure or the like, thereby facilitating a mixing process, increasing dispersion stability and enabling the ionomer to be uniformly distributed on the surface of the carbon structure. The ionomer-coated carbon structure can be applied as a catalyst support, an electrode material or the like in an electrochemical device field such as a fuel cell, a secondary battery, a capacitor or the like.

The invention claimed is:

1. A method for manufacturing an electrode, the method comprising the steps of:
   preparing an electrode forming composition comprising a catalyst and an ionomer;
   performing resonant vibratory mixing of the electrode forming composition by applying a low-frequency acoustic energy to the electrode forming composition, such at an amount of a first ionomer coated on a surface of the catalyst with a thickness of 5 nm or less is 55 to 95 wt % with respect to a total weight of the ionomer; and
   coating the electrode forming composition to manufacture an electrode.

2. The method of claim 1, wherein the low-frequency acoustic energy has a frequency of 10 to 100 Hz.

3. The method of claim 1, wherein the resonant vibratory mixing is performed by applying an accelerated velocity of 10 to 100 G to the electrode forming composition comprising the catalyst and the ionomer.

4. The method of claim 1, wherein the resonant vibratory mixing is performed for 30 seconds to 30 minutes.

5. The method of claim 1, wherein the electrode forming composition further comprises a solvent.

* * * * *